United States Patent [19]
Krulce

[11] Patent Number: 6,072,827
[45] Date of Patent: Jun. 6, 2000

[54] AUTOMATIC BAUD RATE DETECTION

[75] Inventor: Darrell Krulce, Carlsbad, Calif.

[73] Assignee: Xiox Corporation, Burlingame, Calif.

[21] Appl. No.: 08/921,142

[22] Filed: Aug. 29, 1997

[51] Int. Cl.[7] .................................................. H04B 17/00
[52] U.S. Cl. ......................... 375/225; 370/232; 370/233; 370/234
[58] Field of Search ........................... 375/225; 370/232, 370/233, 234

[56] References Cited

U.S. PATENT DOCUMENTS

| | | | |
|---|---|---|---|
| 5,490,209 | 2/1996 | Kennedy et al. | 379/97 |
| 5,627,858 | 5/1997 | Mak et al. | 375/225 |
| 5,631,925 | 5/1997 | Koenzen | 375/225 |
| 5,923,705 | 7/1999 | Willkie et al. | 375/220 |

*Primary Examiner*—Stephen Chin
*Assistant Examiner*—Mohammad Ghayour
*Attorney, Agent, or Firm*—Elmer Galbi

[57] ABSTRACT

A method of automatic baud rate detection disclosed includes use of low cost hardware to detect framing errors, detect actual transitions in a serial transmission, and calculate transitions in the character received. A current baud rate is taken as being correct, too low, or too high as a function of a comparison between actual transitions and calculated transitions in combination with detection of framing errors. A binary search among conventional baud rates establishes a correct baud rate for a low cost automatic baud rate detection receiving device within three "sign on" character presentations.

5 Claims, 5 Drawing Sheets

AUTOMATIC BAUD RATE DETECTION

FIELD OF THE INVENTION

The present invention relates generally to communication protocols and devices, and particularly to a low-cost method and device for automatically detecting baud rate in an asynchronous communication protocol.

BACKGROUND OF THE INVENTION

A popular and long-standing communication protocol is asynchronous character-by-character communication popularly referred to as "serial" or "RS-232." "RS-232" is technically the electrical interface, specifying the voltage levels and impedance requirements for serial communications. Although commonly used to describe serial communications, the RS-232 standard (EIA-232D) does not actually specify characters, framing, start bits, or stop bits. Serial communication, however, is well established according to these conventions. Each character, e.g., eight bit character or seven bit character with parity bit, arrives asynchronously. A character may arrive at any time, but the sequence of bits within a character must be spaced precisely in time to allow the receiving device to accurately sample the incoming signal. A start indicator, i.e., a start bit, and a terminal indicator, i.e., a stop bit, frame the character. The data arrives bit-by-bit on a single transmission conductor and the voltage state of the conductor, i.e., positive or negative voltage, determines the value of the corresponding bit. The transmission conductor state begins at an idle "one" value, i.e., a negative voltage, and goes to a "zero" value or a positive voltage when the start bit appears.

Thus, at the RS-232 interface level a "one" is represented by a negative voltage and a "zero" by a positive voltage. These voltages, however, are typically inverted to logic values, i.e., to a high voltage (5V) as a "one" value and a low voltage (0V) as a "zero" value when viewed by the UART. In the illustrations and discussion herein, this convention of high and low logic voltage referring to "one" and "zero" values, respectively, will be used to illustrate serial communication. The character frame is complete when the "one" value stop bit reappears at an appropriate time.

The receiving device must respond to the start bit and initiate a series of bit samples separated according to what is known as a baud rate. Typical baud rate values are 300, 1200, 2400, 4800, 9600, and 19200 baud. The baud rate refers to the frequency of bit presentation, for the transmitting device, and to the frequency of bit sampling, for the receiving device, both expressed in hertz (Hz). If the receiver operates at any baud rate other than the baud rate used by the transmitting device, the information collected is invalid.

Thus, essential to any serial communication is agreement in baud rate between the transmitting device and the receiving device. Serial communication between modems sometimes begins by negotiating the baud rate. Typically, one of the modems automatically detects the baud rate of the other device and matches this baud rate for subsequent serial communication. Except for modems, however, most serial devices do not include relatively expensive automatic baud rate detection circuitry and capability and do not negotiate or automatically detect baud rates. Rather, the baud rate must be set manually for such devices. This is a source of many installation problems and establishes significant need for relatively inexpensive automatic baud rate detection such as provided under the present invention. In many systems, one device sends a particular prearranged "sign on" character to facilitate automatic baud rate detection, e.g., sends the ASCII code for an "a" character.

FIG. 1 illustrates generally framed character serial communication according to conventional practice as described above. In particular, FIG. 1 portrays in bits 0–6 the ASCII code for the "A" character and in bit 7 the corresponding parity value. A start bit precedes bits 0–7 and a stop bit follows bits 0–7. The framed data sequence, i.e., the start bit, bits 0–7, and the stop bit, is preceded and followed by a "one" value idle interval whereby onset of a "zero" value indicates presentation of the start bit.

Dedicated circuitry often handles the details of serial communication. Such circuitry couples to the serial data conductor, and any other conductors used in support of serial communication, and collects or sends characters according to serial protocol. A separate controlling device, e.g., a processor, sets the baud rate of the dedicated circuitry and relies on the dedicated circuitry to sample the incoming signal in response to the start bit and at the appropriate baud rate. The dedicated circuitry, after collecting the character according to serial protocol, delivers the character to the processor. A common and well know type of dedicated serial communication device is a universal asynchronous receiver/transmitter (UART). In many cases, a UART is incorporated into an integrated processor device.

Automatic baud rate detection is a well known process and a variety of methods of automatic baud rate detection as well as a variety of devices supporting automatic baud rate detection are known. All such prior automatic baud rate detection methods and apparatus, however, are considered expensive in relation to that of the present invention. The subject matter of the present invention reduces the cost of automatic baud rate detection and thereby provides improvement in this subject matter.

SUMMARY OF THE INVENTION

The subject matter of the present invention concerns automatic detection of baud rate by a low-cost receiving device analyzing the serial transmission. Under the present invention, an integrated processor including dedicated serial communication circuitry, e.g., a UART, also includes a DMA (Direct Memory Access) channel which is capable of counting the number of actual transitions occurring on the serial data line independent of baud rate. By receiving a character at a given baud rate and detecting occurrence of frame errors in conjunction with detecting a mismatch between actual transitions and those expected of the character as received the processor identifies the current baud rate as being too high, too low, or correct. A binary search among a set of conventional baud rates quickly moves the device to the correct baud rate.

The subject matter of the present invention is particularly pointed out and distinctly claimed in the concluding portion of this specification. However, both the organization and method of operation of the invention, together with further advantages and objects thereof, may best be understood by reference to the following description taken with the accompanying drawings wherein like reference characters refer to like elements.

BRIEF DESCRIPTION OF THE DRAWINGS

For a better understanding of the invention, and to show how the same may be carried into effect, reference will now be made, by way of example, to the accompanying drawings in which.

DETAILED DESCRIPTION OF THE PREFERRED EMBODIMENT

An important advantage provided by the present invention is a less expensive form of automatic baud rate detection. More particularly, the present invention makes use of a low-cost processor element to implement automatic baud rate detection. The processor element serves a variety of more general functions in a communication device, but particular resources of that processor element are devoted to automatic baud rate detection without significantly increasing the cost of the communication device. Thus, the processor performs its general duties as part of the communication device, and also advantageously implements automatic baud rate detection without significant additional cost, i.e., without incorporation of additional hardware supporting automatic baud rate detection.

Automatic baud rate detection under the present invention relies on the certain characteristics of asynchronous communication to infer the relative magnitude of the current baud rate, i.e., too high, too low, or correct. Framing errors aid in inferring the relative magnitude of the current baud rate. Also, actual state transitions in the incoming serial signal are compared with calculated state transitions in a character as received.

A framing error occurs when the receiving device sees a "zero" value when it is expecting a "one" value as the stop bit. Framing errors generally, but not always, result when a receiver is set at a different baud rate than the data being sent. A receiver operating at a higher baud rate likely samples data within the character. Such mid-character data can be a "one" value or a "zero" value, but the receiver expects at this time to see the "one" value stop bit. If the data sampled is a "zero" value then a framing error occurs because the receiving device expects at that time to read a "one" value, i.e., expects to read the stop bit. In the case of a single character sent at a baud rate greater than the receiving device, a framing error does not occur. This is because at the time the receiving device expects to see the stop bit, the stop bit will have already arrived and the data line will have been maintained at "one" value to establish the idle interval preceding the next character transmission. Thus, framing errors can under certain conditions be associated with a receiving device operating at a baud rate higher than data presentation.

If a receiving device is set at a lower baud rate than the data being sent, then the actual number of one-to-zero transitions in the serial data stream will generally, but not always, be greater than the one-to-zero transitions indicated in the received character. Because the receiver misses some bits when sampling at too low of a baud rate, some one-to-zero transitions will generally, but not always, be missed.

Figure 1:
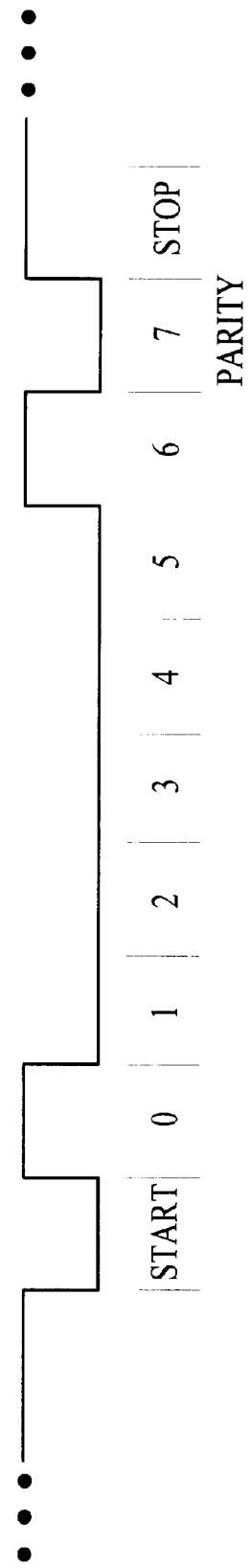
FIG. 1 illustrates conventional framed serial data transmission using a start bit, seven data bits, one parity bit, and one stop bit as described above.
Figure 2:
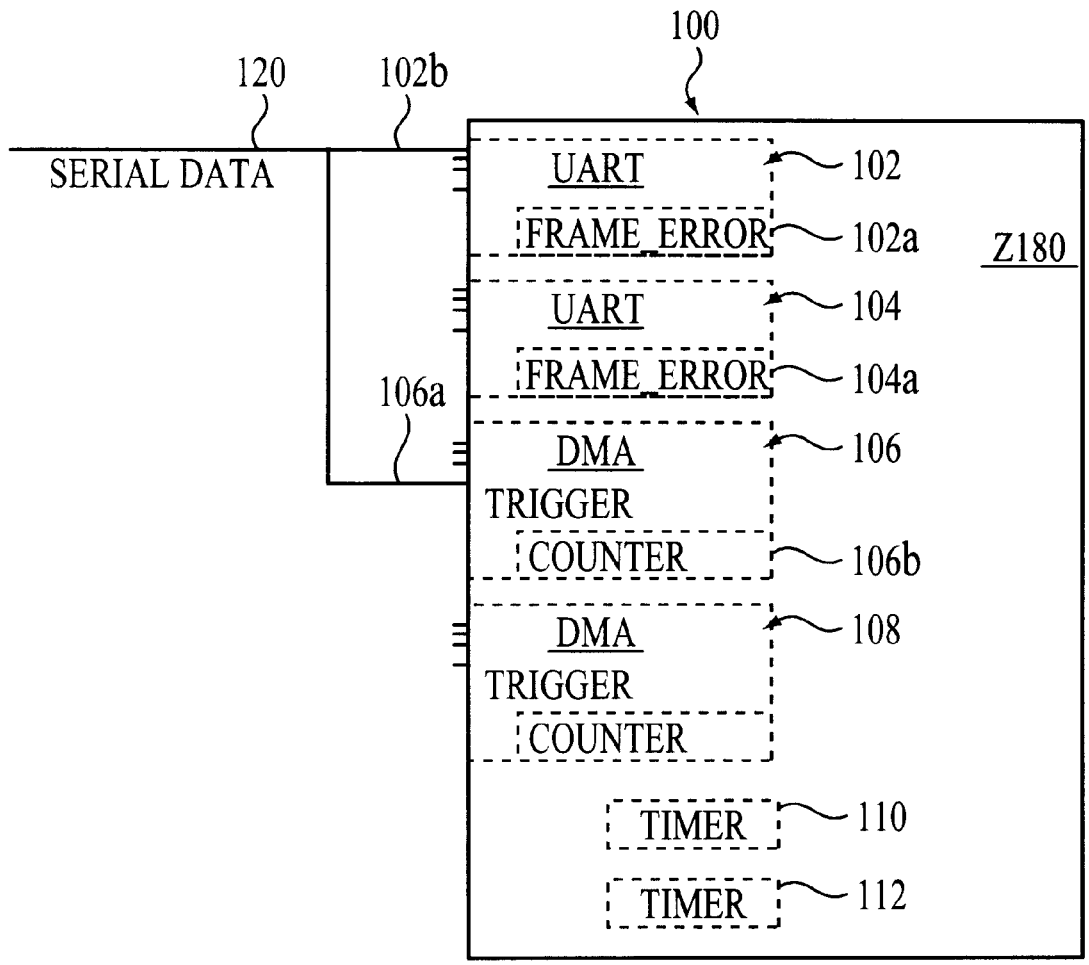
FIG. 2 illustrates by block diagram a low cost processor including apparatus supporting automatic baud detection under the present invention.

FIG. 2 illustrates schematically a processor 100 implementing automatic baud rate detection under the present invention. The particular embodiment of the present invention illustrated herein employs as processor 100 the relatively inexpensive Z180 processor available from Zilog, Inc. It will be understood, however, that a variety of general-purpose integrated processors may be employed in implementation of the present invention. Under the particular embodiment of the present invention shown herein, an "edge-triggered" portion of the DMA channel of processor 100 is used. Some Motorola processors allow edge-triggered DMA transfers and could, therefore, be used to implement the present invention in a manner similar to that shown herein. Intel processors, however, appear to use level-sense DMA transfers and could not be used to implement the present invention directly in the manner shown herein. A simple external circuit counter using a 74xx393 integrated circuit, however, could be used to implement the present invention on a processor lacking a transition or edge detection function. Generally, the method of automatic baud rate detection shown herein can be implemented on any processor that has an input capable of transition counting, whether it is a DMA channel or some other resource, including an external counter chip added as an inexpensive additional resource.

Processor 100 includes internally a UART 102 and a UART 104. UARTS 102 and 104 each include a FRAME_ERROR flag 102a and 104a, respectively. UARTS 102 and 104 operate in conventional fashion to set the corresponding FRAME_ERROR true when a stop bit is expected but not detected.

Processor 100 includes internally a DMA channel 106 and a DMA channel 108. Conventional use of DMA channels 106 and 108 allows a separate device, e.g., a disk drive, to directly access, i.e., read or write, memory elements associated with processor 100 without otherwise requiring support from processor 100. Each of DMA channels 106 and 108 include an edge-triggered input 106a and 108a, respectively. Conventional use of trigger inputs 106a and 108a informs processor 100 that an external device has requested a data transfer. Each DMA channel 106 and 108 includes a counter 106b and 108b, respectively. The counters 106b and 108b count every byte transferred, e.g., for every one-to-zero transition detected at the corresponding trigger input 106a or 108a.

Processor 100 has two interrupt timers, individually timer 110 and timer 112 operating in conventional fashion.

A serial data line 120 couples to the data pin 102b of UART 102 and, in accordance with the present invention, also to the DMA trigger input 106a. As will be appreciated, serial communication may include additional conductors (not shown) coupled to UART 102. Processor 100 reads and resets counter 106b upon receipt of a complete character. Counter 106b is then ready to count the transitions of the next character. Processor 100 thereby automatically counts the number of actual one-to-zero transitions in a given character presentation on data line 120 by later reading counter 106b. In this use, DMA channel 106 transfers no meaningful data to or from memory, but does serve to count the number of actual one-to-zero transitions occurring on data line 120. By resetting counter 106b just following start bit presentation and reading counter 106b just following stop bit presentation, processor 100 obtains the number of actual one-to-zero transitions in a given character independent of baud rate for that serial communication.

Thus, by detecting actual one-to-zero transitions, e.g., by use of separate hardware such as the DMA channel of the Z180 processor 100, and by calculating character one-to-zero transitions, i.e., in a character as received, one detects a mismatch between actual transitions and character transitions.

Under the present invention, detection of framing errors in combination with detection of transition mismatches supports automatic baud rate detection via a binary baud rate search method. Under such binary search method, one establishes a baud rate and determines if it is high, low, or correct. The method determines whether the baud rate established need be increased or decreased relative to its current setting. If the actual transition count is greater than the character transition count, then the receiver baud rate is considered too low, and is increased in the next step of the binary baud rate search. If, however, a framing error occurs and the actual transition count is not greater than the character transition count, then the receiver baud rate is considered too high and is reduced in the next step of the binary baud rate search. In addition to the above two tests, an additional test detects, in the absence of a framing error, the actual transition count being less than the character transition count. In this case, the receiver baud rate is considered too high and is reduced in the next step of the binary baud rate search. Otherwise, the baud rate is considered correct.

Figure 3:
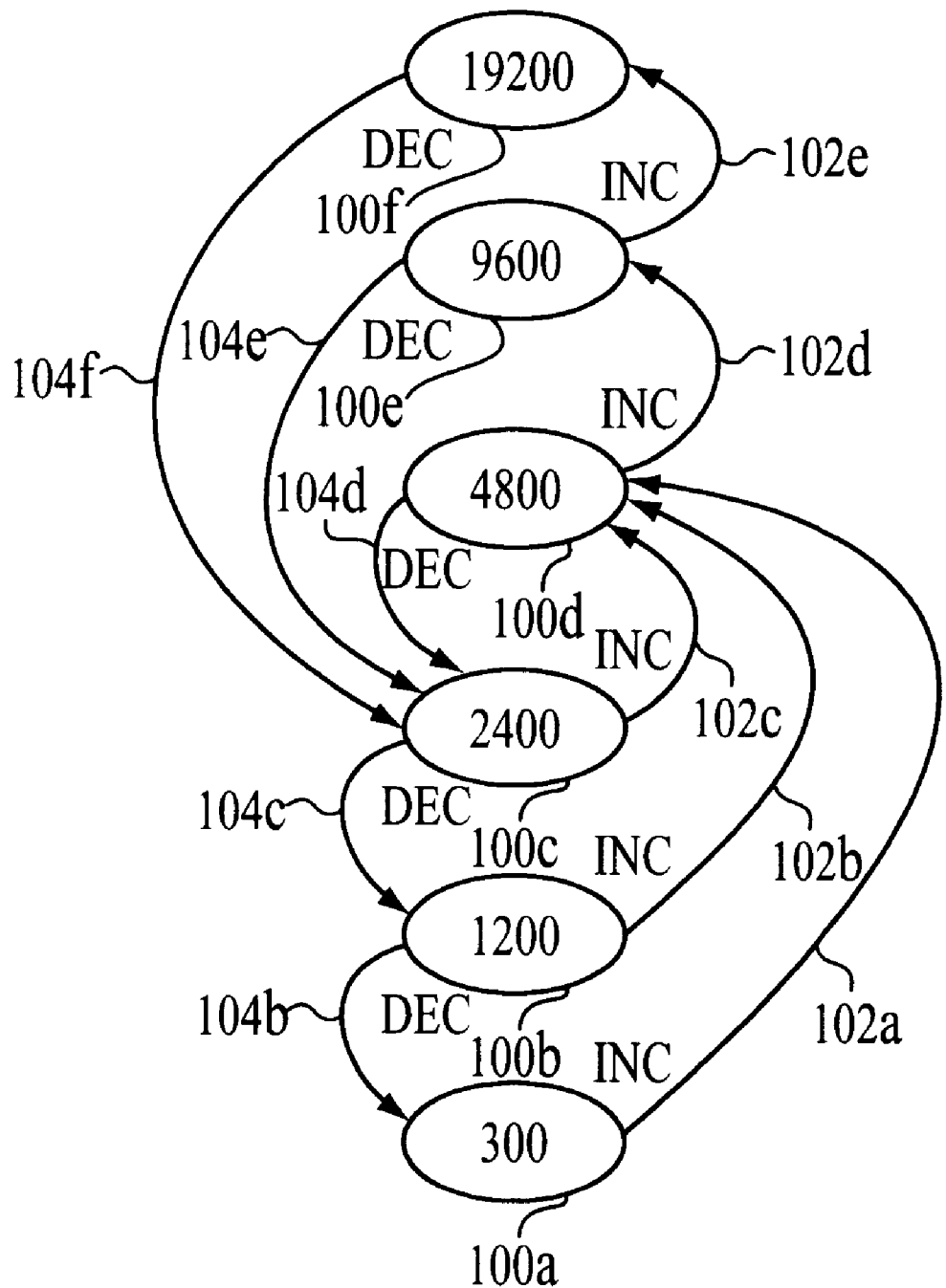
FIG. 3 illustrates a binary baud rate search strategy selecting from among a set of conventional baud rates.

Conventional baud rates occur at predetermined values. For example, conventional baud rates are 300, 1200, 2400, 4800, 9600, and 19200 baud. A binary search may be conducted through this set of potential baud rates to efficiently select the appropriate baud rate based on a determination as to whether a current baud rate is too high or too low as discussed above. FIG. 3 illustrates by state diagram a binary search method selecting a baud rate from a set of conventional baud rates. Each state 100, individually 100a–100f corresponds to one of the baud rates 300, 1200, 2400, 4800, 9600, and 19200 baud, respectively. The state diagram of FIG. 3 indicates a next state 100 following an increment or decrement state transition 102 relative to a current state 100. Increment transitions 102a–102c from states 100a–100c respectively all terminate at state 100d, i.e., baud rate 4800. Increment transition 102d moves from state 100d to state 100e, i.e., to baud rate 9600. Increment transition 102e moves from state 100e to state 100, i.e., to baud rate 19200. Decrement transitions 104d–104f from states 100d–100f terminate at state 100c, i.e., at baud rate 2400. Decrement transition 104c from state 100c terminates at state 100b, i.e., at baud rate 1200. Decrement transition 104b moves from state 100b to state 100a, i.e., to baud rate 300.

Thus, each of states 100 may be incremented or decremented to another one of states 100 according to the binary search strategy illustrated in FIG. 3. Generally, the initial baud rate selected is either 300 baud, i.e., state 100a, or 19200 baud, i.e., state 100f. From these states, the current baud rate may be initially incremented, in the case of state 100, or decremented, in the case of state 100f, in search of an appropriate baud rate. By thereafter detecting whether the current baud rate is high, low, or correct, eventually the appropriate baud rate is found using the binary search method of FIG. 3.

If the receiving device baud rate is set considerably lower than data being sent and if the data being sent consists of single characters with sufficient length idle intervals therebetween, then the receiving device may not see a character at all. For example, the character may appear in the first half of what the receiving device considers the start bit. Under such situation a "false start" condition would be detected. Processor 100 sets timer 110 as a function of the current baud rate in response to the start bit to prevent such indeterminate condition. If no character is recognized by the receiving device within what it considers to be two character widths under the current baud rate, then the receiver baud rate is considered too low.

Figure 4:
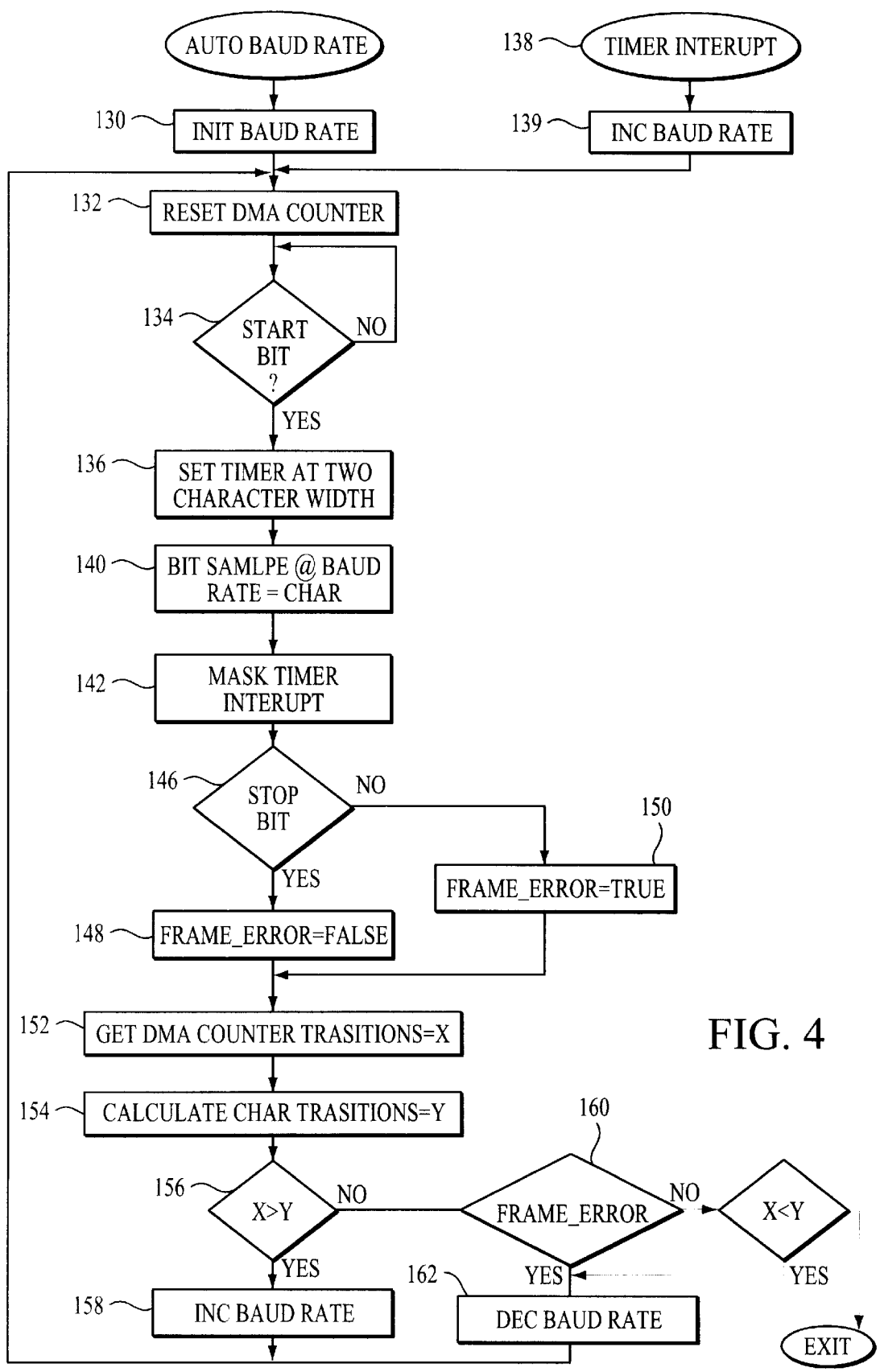
FIG. 4 illustrates by flow chart automatic baud rate detection under the present invention.

FIG. 4 illustrates by flow chart automatic baud rate detection under the present invention taking into account the above-described characteristics of serial communication concerning frame errors and detected mismatch between actual transitions and character transitions. In block 130, an initial baud rate is selected and applied to UART 102. With reference to FIG. 3, the initial baud rate maybe either 300 baud, i.e., state 100a, or 19200 baud, i.e., state 100f. Processor 100 then resets in block 132 DMA counter 106b in preparation for counting actual transitions in the next character presentation.

Decision block 134 represents a pending character presentation on the serial communication line 120. Processing loops at decision block 134 until start bit presentation, i.e., DMA input 106a detects a start bit transition from one-to-zero indicating the onset of character presentation. Following presentation of the start bit, processing advances to block 136. In block 136, processor 100 sets timer 110 for interrupt at a time interval according to two character widths at the current baud rate. Timer 110 is thereby set to prevent a potential "false start" condition if the current baud rate is set considerably lower than the target baud rate, i.e., the baud rate of serial data presentation. If timer 110 later causes an interrupt as indicated at interrupt process 138, processing passes through block 139 where the baud rate is incremented and processing then returns to block 132.

Processing advances from block 136 to block 140 where the character bits are sampled by UART 102 bit-by-bit according to the current baud rate. The resulting eight bit value is stored in the variable CHAR. Because a character has arrived within two character widths time, no "false start" condition has occurred and the timer interrupt 110 is cleared or masked in block 142. Continuing to decision block 146, at this time a stop bit should be present on the communication line. In other words, the receiving device expects at this time to see a stop bit or a framing error exists. If a stop bit is present, then processing passes from decision block 146 to block 148 where the variable FRAME_ERROR is set to false. Otherwise, a framing error exists and processing passes through block 150 where the variable FRAME_ ERROR is set true.

Processing then advances to block 152 where processor 100 obtains the actual number of one-to-zero transitions occurring on the serial communication line 120. More particularly, Processing in block 152 accesses DMA counter 106b to determine the number of such one-to-zero transitions and assign this value to the variable X. Continuing to block 154, the number of one-to-zero transitions in the character interpreted as received are calculated and assigned to the variable Y. In decision block 156, the number of actual one-to-zero transitions is compared to the number of character one-to-zero transitions, i.e., the relative magnitude of variables X and Y are compared. If the number of actual transitions is greater than the number of character transitions, then the current baud rate is too low and processing passes from decision block 156 to block 158 where the current baud rate is incremented. Processing then returns to block 132. However, if the number of actual one-to-zero transitions is not greater than the number of character one-to-zero transitions, then processing passes to decision block 160. If a framing error was previously detected in decision block 146, then processing passes from decision block 160 to block 162 where the current baud rate is decremented and processing returns to block 132. If no framing error is present, then processing passes from decision block 160 to decision block 170. Decision block 170 detects whether the number of actual one-to-zero transitions is less than the number of character one-to-zero transitions. If the number of actual transitions is less than the number of character transitions, then processing passes from decision block 170 to block 162 where the current baud rate is decremented and processing then returns to block 132. Otherwise, the current baud rate is the correct baud rate and processing exits from decision block 170.

Since a frame error or transition count mismatch does not occur for all characters when the baud rates are mismatched, particular characters may be used as "sign on" characters to enhance detection of baud rate under the present invention. The ASCII code for character DC4 (control-T or hex 14) is considered useful under the present invention.

Figure 5:
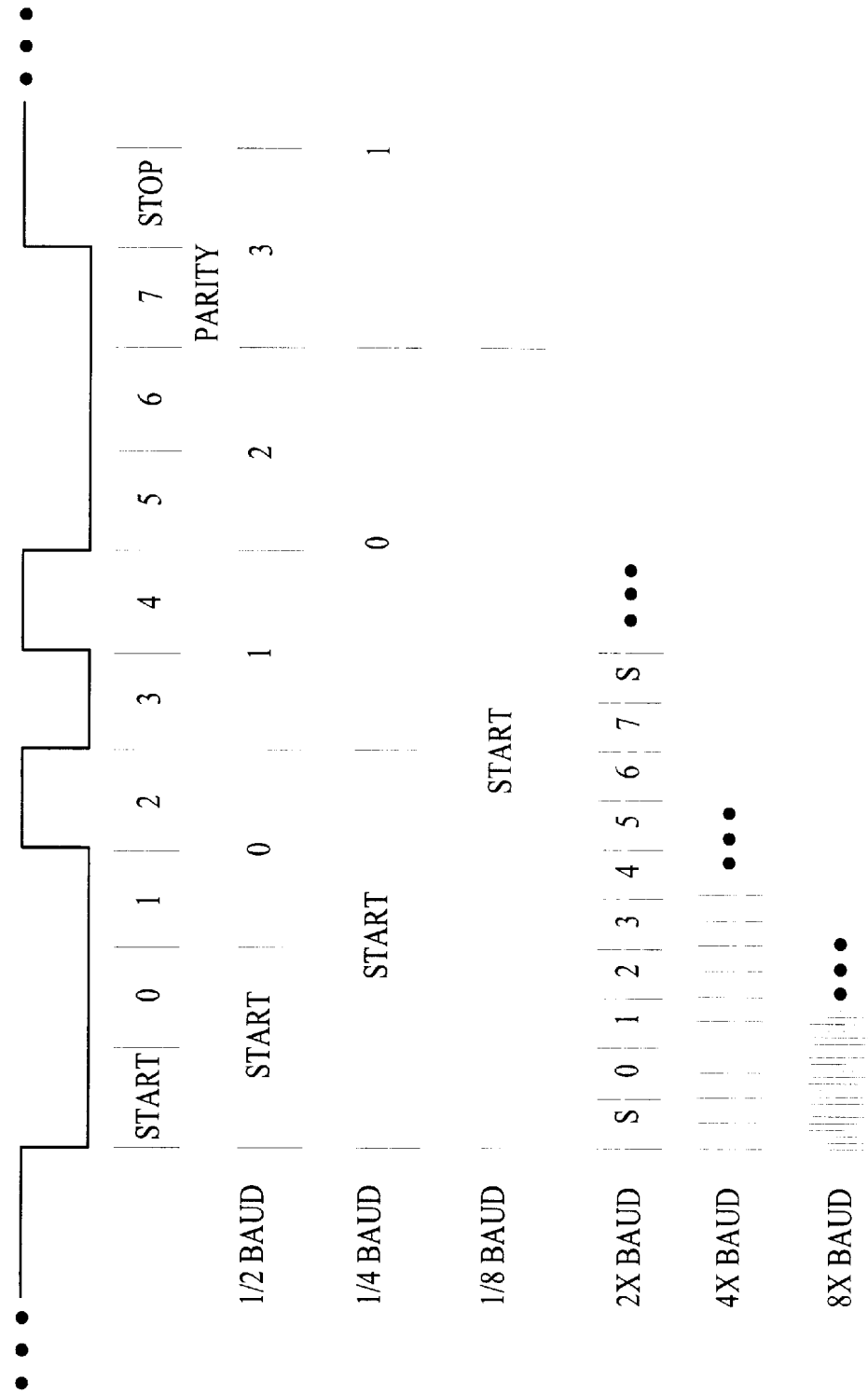
FIG. 5 illustrates serial transmission of a particular "sign on" character proposed under the present invention and also various receiver baud rates operating higher and lower than the transmission baud rate for the "sign on" character.

FIG. 5 illustrates "sign on" character DC4 at a given baud rate and interpretation thereof at various receiver baud rates. If the receiving device baud rate is set lower than the data sent, then character DC4 is guaranteed to generate a transition count mismatch. At half the correct baud rate, the receiver will see bits 1 and 2 as bit 0, see bits 3 and 4 as bit 1, and see bits 5 and 6 as bit 2. Regardless of how it reads these bits, it can see a maximum of only a single one-to-zero transition. The transition counter 106b will see two one-to-zero transitions and a transition mismatch is guaranteed. This same scenario holds true at a quarter baud rate. At less than a quarter of the baud rate, the receiver will see no one-to-zero transitions.

If the receiver baud rate is set higher than the data sent, then character DC4 is guaranteed to generate a frame error. At twice the correct baud rate, the receiver will see the stop bit during bit 3. At four times, it will see the stop bit during bit 1. At eight times, it will see the stop bit during bit 0. At any greater baud rate, it will see the stop bit during the start bit.

By using character DC4 as a "sign on" character, the automatic baud rate detection method of the present invention correctly determines the correct baud rate in three attempts, i.e., by monitoring three occurrences of the character DC4 sent as a "sign on" character from the transmitting device. When transmitting three "sign on" characters in each attempt, the receiving device and sending device agree on baud rate as of the second attempt.

It is noted that while the specific embodiment shown herein utilizes a Z180 micro processor other similar micro processors could also be used to practice the present invention.

It will be appreciated that the present invention is not restricted to the particular embodiment that has been described and illustrated, and that variations may be made therein without departing from the scope of the invention as found in the appended claims and equivalents thereof.

What is claimed is:

1. An integrated system including automatic baud rate detection from a set of available baud rates, said system comprising:

a programmable central processor;

a serial communication port coupled to a serial data line which provides data at an actual baud rate; and a trigger input independent of said serial communication port and coupled to said serial data line for indicating signal transitions on said serial data line;

said programmable central processor being programmed to establish a current baud rate for said serial communication port, collect a character from said serial communication port at said current baud rate, identify a frame error associated with said character, count the number of signal transitions on said trigger input during presentation of said character, determine the magnitude of said actual baud rate from said count of signal transitions on said trigger input in relation to the number of transitions as indicated by said character and increasing or decreasing said current baud rate of said serial communication port in accordance with a binary search of said set of available baud rates to make said current baud rate equal said actual baud rate.

2. A device according to claim 1 wherein said programmable central processor is programmed to determine whether said current baud rate is one of too high, too low, and correct relative to said actual baud rate by comparing the number of actual given transitions on said serial data line with the number of transitions expected as a function of said character as received and by reference to said frame error.

3. A device according to claim 1 wherein said trigger input is associated with a DMA (Direct Memory Access) channel of said integrated processor.

4. A device according to claim 1 wherein said programmable central processor modifies said current baud rate as a function of whether said current baud rate is too high, too low, and correct.

5. In combination, a serial communication link including a data line;

a processor including a UART (Universal Asynchronous Receiver Transmitter) and a DMA (Direct Memory Access) channel, said UART having a data pin coupled to said data line, said DMA channel having a trigger input also coupled to said data line, said processor being programmed to establish a first baud rate for said UART, receive a character at said UART, detect occurrence of a frame error in relation to said character, count by means of said trigger input actual transitions on said data line associated with presentation of said character on said data line; calculate character transitions by reference to said character as received; compare said actual transitions and said character transitions, and establish a second baud rate for said UART as a function of said frame error when detected and the comparison of actual transitions and said character transitions.

* * * * *